(12) United States Patent
Lewis et al.

(10) Patent No.: US 10,815,788 B2
(45) Date of Patent: Oct. 27, 2020

(54) TURBINE BLADE WITH SLOT FILM COOLING

(71) Applicant: United Technologies Corporation, Farmington, CT (US)

(72) Inventors: Scott D. Lewis, Vernon, CT (US); Kyle C. Lana, Portland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 672 days.

(21) Appl. No.: 15/419,612

(22) Filed: Jan. 30, 2017

(65) Prior Publication Data

US 2018/0216472 A1 Aug. 2, 2018

(51) Int. Cl.
| | |
|---|---|
| *F01D 5/18* | (2006.01) |
| *F01D 5/06* | (2006.01) |
| *F01D 5/20* | (2006.01) |
| *F02C 3/04* | (2006.01) |

(52) U.S. Cl.
CPC .............. *F01D 5/186* (2013.01); *F01D 5/06* (2013.01); *F01D 5/187* (2013.01); *F01D 5/20* (2013.01); *F02C 3/04* (2013.01); *F05D 2220/32* (2013.01); *F05D 2240/307* (2013.01); *F05D 2240/35* (2013.01); *F05D 2250/324* (2013.01); *F05D 2260/202* (2013.01); *F05D 2260/2214* (2013.01); *Y02T 50/673* (2013.01); *Y02T 50/676* (2013.01)

(58) Field of Classification Search
CPC . F01D 5/186; F01D 5/06; F01D 5/187; F01D 5/20; F01D 5/18; F05D 2220/32; F05D 2240/307; F05D 2250/324; F05D 2260/202; F05D 2260/2214

USPC ......................................................... 415/115
See application file for complete search history.

(56) References Cited

U.S. PATENT DOCUMENTS

| | | | | |
|---|---|---|---|---|
| 5,062,768 | A * | 11/1991 | Marriage | F01D 5/186 29/889.721 |
| 5,688,107 | A * | 11/1997 | Downs | F01D 5/18 415/173.1 |
| 6,086,328 | A | 7/2000 | Lee | |
| 8,066,485 | B1 * | 11/2011 | Liang | F01D 5/186 415/115 |
| 8,231,330 | B1 | 7/2012 | Liang | |
| 8,454,310 | B1 * | 6/2013 | Downs | F04D 29/164 416/1 |
| 8,777,571 | B1 * | 7/2014 | Liang | F01D 5/187 416/97 R |

(Continued)

FOREIGN PATENT DOCUMENTS

WO 20170119898 A1 7/2017

OTHER PUBLICATIONS

European Search Report for Application No. 18 15 3612; dated Jun. 22, 2018.

(Continued)

*Primary Examiner* — Connor J Tremarche
(74) *Attorney, Agent, or Firm* — Cantor Colburn LLP

(57) ABSTRACT

A component for a gas turbine engine, the component having: a cooling slot located on a surface of the component, the cooling slot being defined by a plurality of diffuser portions each extending from a respective one of a plurality of cooling openings providing cooling fluid to the cooling slot.

16 Claims, 11 Drawing Sheets

(56) References Cited

U.S. PATENT DOCUMENTS

| | | | |
|---|---|---|---|
| 2005/0111979 A1* | 5/2005 | Liang | F01D 5/186 |
| | | | 416/97 R |
| 2008/0279697 A1 | 11/2008 | Liang | |
| 2013/0243596 A1* | 9/2013 | Quach | F01D 5/187 |
| | | | 416/92 |

OTHER PUBLICATIONS

European Office Action dated Mar. 31, 2020 for Application No. 18 153 612.9.

* cited by examiner

TURBINE BLADE WITH SLOT FILM COOLING

BACKGROUND

This disclosure relates generally to gas turbine engines and, more particularly, to rotor or turbine blades of gas turbine engines.

The tips of turbine blades are notoriously difficult to cool since any thermal barrier coatings placed there are likely to rub off. The turbine blades and BOAS (blade outer air seals) are designed to have very tight clearances at cruise to improve aerodynamic performance which means that at other performance points in the flight envelope the blade and the BOAS may be rubbing causing the thermal barrier coating to be removed.

Accordingly, it is desirable to provide turbine airfoils and/or engines with airfoils that reduce the heat load on the tip of the airfoil as well as preventing the detrimental effects associated with leakage airflows.

BRIEF DESCRIPTION

In one embodiment, a component for a gas turbine engine is provided. The component having: a cooling slot located on a surface of the component, the cooling slot being defined by a plurality of diffuser portions each extending from a respective one of a plurality of cooling openings providing cooling fluid to the cooling slot.

In addition to one or more of the features described above, or as an alternative to any of the foregoing embodiments, the plurality of diffuser portions may be defined by a diffuser angle with respect to the cooling opening.

In addition to one or more of the features described above, or as an alternative to any of the foregoing embodiments, the diffuser angle may be in a range of 5-20 degrees with respect to the cooling opening.

In addition to one or more of the features described above, or as an alternative to any of the foregoing embodiments, each of the plurality of diffuser portions may merge with another one of the plurality of diffuser portions below a surface of the component.

In addition to one or more of the features described above, or as an alternative to any of the foregoing embodiments, a plurality of cooling slots may be located in the surface of the component.

In addition to one or more of the features described above, or as an alternative to any of the foregoing embodiments, at least one of the plurality of cooling slots may be defined by four diffuser portions each extending from a respective one of a plurality of cooling openings providing cooling fluid to the at least one cooling slot.

In addition to one or more of the features described above, or as an alternative to any of the foregoing embodiments, the component may be a blade having an airfoil with a tip portion and the cooling slot is located in the tip portion of the airfoil, and the blade further comprises a squealer pocket located in a surface of the tip portion.

In addition to one or more of the features described above, or as an alternative to any of the foregoing embodiments, the component may be a blade having an airfoil with a tip portion and the cooling slot is located in a tip shelf of the airfoil.

In addition to one or more of the features described above, or as an alternative to any of the foregoing embodiments, the component may be a blade having an airfoil with a tip portion and the blade is a turbine blade and at least a portion of a pressure side of the blade proximate to the tip portion is convex.

In addition to one or more of the features described above, or as an alternative to any of the foregoing embodiments, the component may be a blade having an airfoil with a tip portion and the cooling slot is located proximate to a pressure side of the airfoil.

In addition to one or more of the features described above, or as an alternative to any of the foregoing embodiments, each of the plurality of diffuser portions may merge with another one of the plurality of diffuser portions below a surface of the tip portion.

In addition to one or more of the features described above, or as an alternative to any of the foregoing embodiments, the cooling slot may be defined by four diffuser portions each extending from a respective one of a plurality of cooling openings providing cooling fluid to the at least one cooling slot.

In addition to one or more of the features described above, or as an alternative to any of the foregoing embodiments, the cooling slot may be defined by two diffuser portions each extending from a respective one of a plurality of cooling openings providing cooling fluid to the at least one cooling slot.

In addition to one or more of the features described above, or as an alternative to any of the foregoing embodiments, the component may be a turbine blade of the gas turbine engine.

In yet another embodiment, a blade for a gas turbine engine is provided. The blade having: an airfoil, the airfoil having a tip portion; and a cooling slot located in the tip portion of the airfoil, the cooling slot being defined by a plurality of diffuser portions each extending from a respective one of a plurality of cooling openings providing cooling fluid to the cooling slot.

In addition to one or more of the features described above, or as an alternative to any of the foregoing embodiments, the plurality of diffuser portions may be defined by a diffuser angle with respect to the cooling opening.

In addition to one or more of the features described above, or as an alternative to any of the foregoing embodiments, the diffuser angle may be in a range of 5-20 degrees with respect to the cooling opening.

In addition to one or more of the features described above, or as an alternative to any of the foregoing embodiments, each of the plurality of diffuser portions may merge with another one of the plurality of diffuser portions below a surface of the tip portion.

In addition to one or more of the features described above, or as an alternative to any of the foregoing embodiments, a plurality of cooling slots may be located in the tip portion of the airfoil.

In addition to one or more of the features described above, or as an alternative to any of the foregoing embodiments, at least one of the plurality of cooling slots may be defined by four diffuser portions each extending from a respective one of a plurality of cooling openings providing cooling fluid to the at least one cooling slot.

In addition to one or more of the features described above, or as an alternative to any of the foregoing embodiments, further including a squealer pocket located in a surface of the tip portion.

In addition to one or more of the features described above, or as an alternative to any of the foregoing embodiments, the cooling slot may be located in a tip shelf of the airfoil.

In addition to one or more of the features described above, or as an alternative to any of the foregoing embodiments, the blade may be a turbine blade.

In addition to one or more of the features described above, or as an alternative to any of the foregoing embodiments, the cooling slot may be located proximate to a pressure side of the airfoil.

In addition to one or more of the features described above, or as an alternative to any of the foregoing embodiments, each of the plurality of diffuser portions may merge with another one of the plurality of diffuser portions below a surface of the tip portion.

In addition to one or more of the features described above, or as an alternative to any of the foregoing embodiments, the cooling slot may be defined by four diffuser portions each extending from a respective one of a plurality of cooling openings providing cooling fluid to the at least one cooling slot.

In addition to one or more of the features described above, or as an alternative to any of the foregoing embodiments, the cooling slot may be defined by two diffuser portions each extending from a respective one of a plurality of cooling openings providing cooling fluid to the at least one cooling slot.

In addition to one or more of the features described above, or as an alternative to any of the foregoing embodiments, at least a portion of a pressure side of the blade proximate to the tip portion may be convex.

In another embodiment, a gas turbine engine is provided. The gas turbine engine having: a compressor section; a combustor section; and a turbine section; wherein the turbine section includes a plurality of rotors having a plurality of radially disposed rotor blades at least some of the plurality of radially disposed rotor blades having: an airfoil, the airfoil having a tip portion; and a cooling slot located in the tip portion of the airfoil, the cooling slot being defined by a plurality of diffuser portions each extending from a respective one of a plurality of cooling openings providing cooling fluid to the cooling slot.

In addition to one or more of the features described above, or as an alternative to any of the foregoing embodiments, the plurality of diffuser portions may be defined by a diffuser angle with respect to the cooling opening.

In addition to one or more of the features described above, or as an alternative to any of the foregoing embodiments, the diffuser angle may be in a range of 5-20 degrees with respect to the cooling opening.

In addition to one or more of the features described above, or as an alternative to any of the foregoing embodiments, each of the plurality of diffuser portions may merge with another one of the plurality of diffuser portions below a surface of the tip portion.

In addition to one or more of the features described above, or as an alternative to any of the foregoing embodiments, a plurality of cooling slots may be located in the tip portion of the airfoil.

In addition to one or more of the features described above, or as an alternative to any of the foregoing embodiments, the cooling slot may be located in a tip shelf of the airfoil and the airfoil may have additional cooling openings.

In addition to one or more of the features described above, or as an alternative to any of the foregoing embodiments, at least a portion of a pressure side of the blade proximate to the tip portion may be convex.

In yet another embodiment, a method of cooling a portion of a component of a gas turbine engine is provided. The method including the steps of: forming a cooling slot in the tip portion by a machining process, wherein the cooling slot is defined by a plurality of diffuser portions each extending from a respective one of a plurality of cooling openings providing cooling fluid to the cooling slot.

In addition to one or more of the features described above, or as an alternative to any of the foregoing embodiments, the machining process may be an electrical discharge machining process.

In addition to one or more of the features described above, or as an alternative to any of the foregoing embodiments, at least a portion of a pressure side of the blade proximate to the tip portion may be convex.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Various embodiments of the present disclosure are related to turbine blades with slots for abating the heat load on the tip of the airfoil of the turbine blade as well as preventing the detrimental effects associated with leakage airflows. Although engine airfoils are discussed herein, it is understood that embodiments of this disclosure may be applied on any turbomachinery component that requires the aforementioned cooling or tip cooling for example, the slots may be positioned on compressor blades of the gas turbine engine, stationary vanes, blade outer air seals (BOAS).

A detailed description of one or more embodiments of the disclosed apparatus and method are presented herein by way of exemplification and not limitation with reference to the FIGS.

Figure 1:
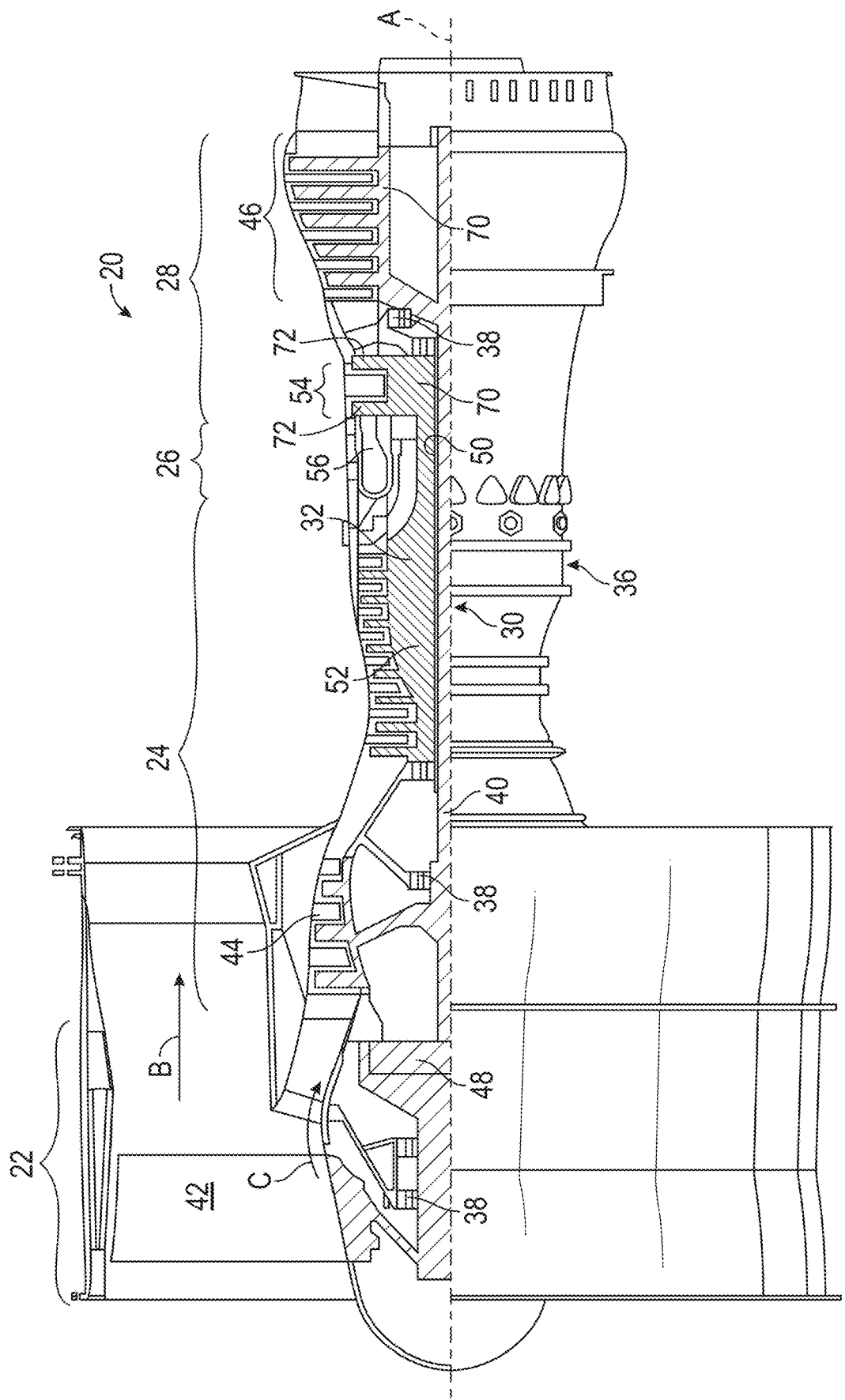
FIG. 1 is a cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including but not limited to three-spool architectures, single spool architectures, etc.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7° \ R)]^{0.5}$. The "Low corrected fan tip speed" as disclosed herein according to one non-limiting embodiment is less than about 1150 ft/second (350.5 m/sec).

The high pressure turbine 54 or low pressure turbine 46 of the turbine section 28 may include a plurality of turbine discs 70 that each rotate about the axis A. As is known in the related arts, the high pressure turbine 54 may include a plurality of stages each having a plurality of turbine blades 72 mounted to respective turbine disk of each stage.

Figure 2:
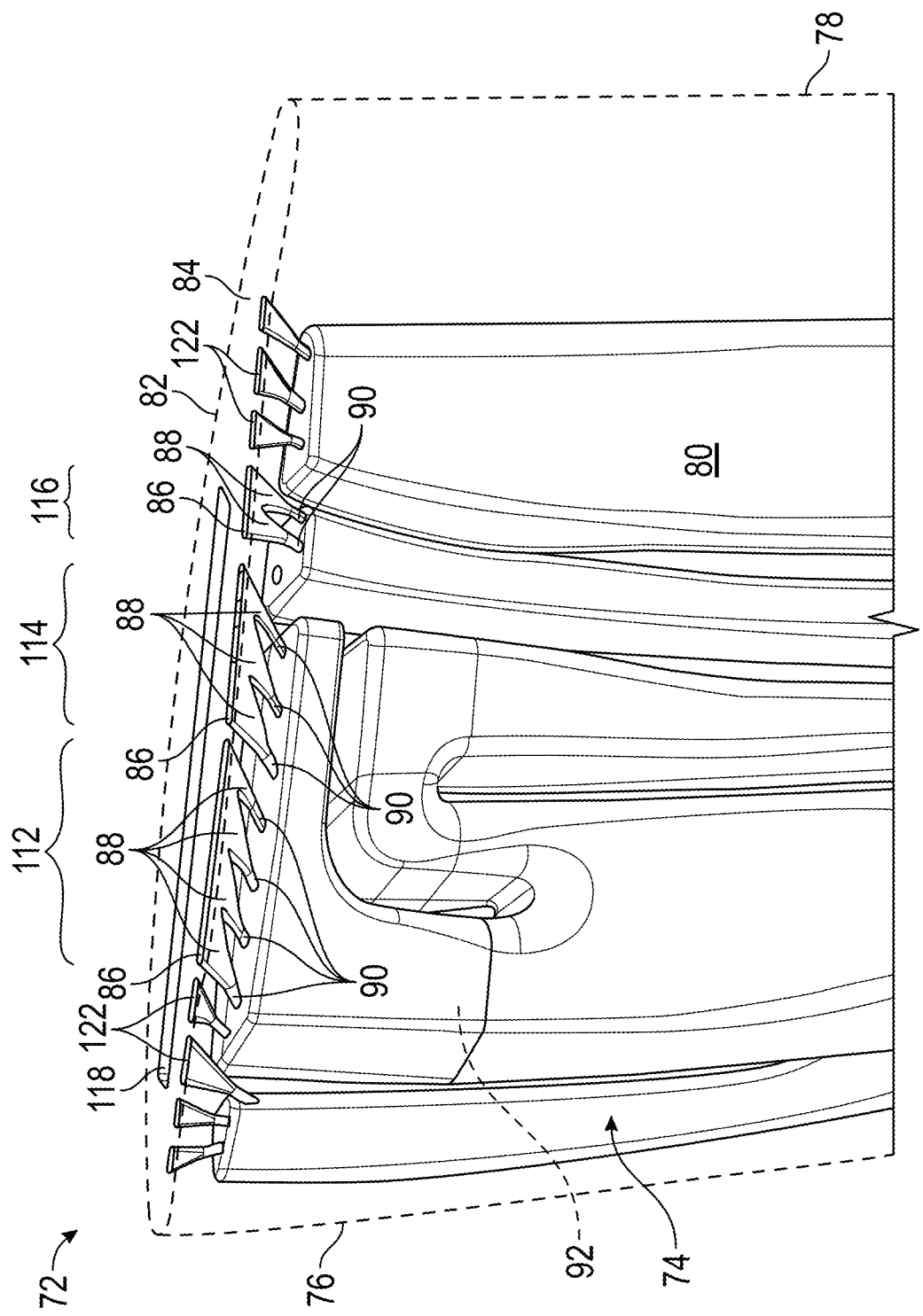
FIG. 2 is a perspective view illustrating a turbine blade in accordance with an embodiment of the disclosure.
Figure 3A:
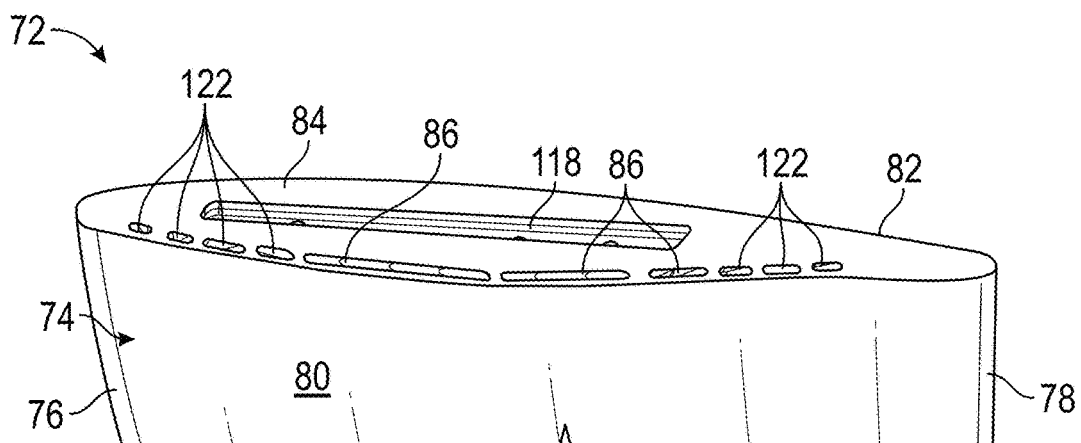
FIG. 3A is a top perspective view of the turbine blade illustrated in FIG. 2.
Figure 3B:
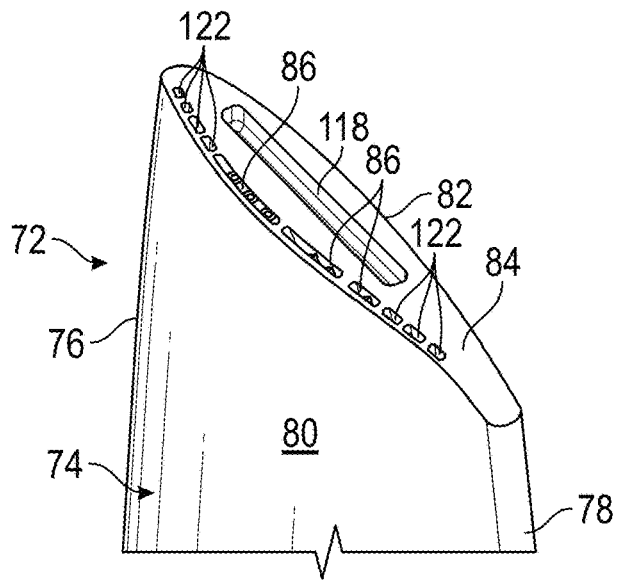
FIGS. 3B and 3C are side perspective views of the turbine blade illustrated in FIG. 2.
Figure 3C:
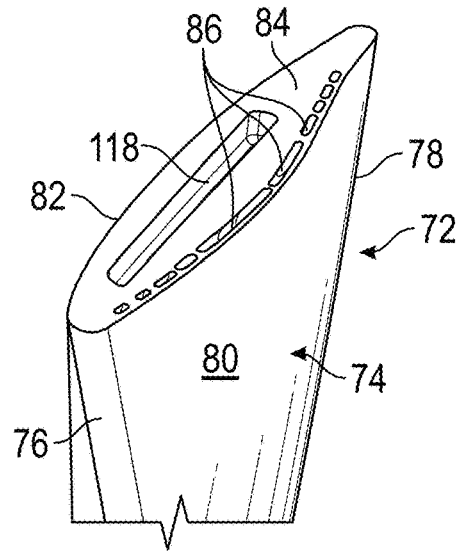

Referring now to FIG. 2 is a diagrammatic illustration of a portion of one embodiment of a turbine blade 72 for use in the turbine section 28 of the gas turbine engine 20 is illustrated. In one embodiment, the turbine blade 72 may be a blade in the high pressure turbine 54. Since turbine blade 72 is downstream from the combustor section 26 and it is proximate to the combustor it is desirable to provide the turbine blade 72 with a cooling film or cooling fluid flows. Although, turbine blade 72 is discussed as a blade of the high pressure turbine 54, turbine blade 72 may also be a blade of the low pressure turbine 46 or both the high pressure turbine 54 and the low pressure turbine 46. In this view the exterior of the blade 72 is illustrated in phantom or by dashed lines. The turbine blade 72 has an airfoil 74 with a leading edge 76, a trailing edge 78, a pressure side 80 and a suction side 82. The airfoil 74 terminates at a tip portion 84, which is located in close proximity to a blade outer air seals (BOAS).

In accordance with an embodiment of the present disclosure, the tip portion 84 of the airfoil 74 is provided with a cooling slot or tip slot or slots 86 that is/are defined by the merging of diffuser portions 88 of cooling holes 90. As used herein and as illustrated in the attached FIGS, a cooling slot or slots 86 or tip cooling slot or slots 86 refers to a slot formed in accordance with various embodiments of the present disclosure, which may be located in anyone of a variety of components that require cooling or film cooling. For example, non-limiting examples of components requiring cooling are those of gas turbine engines. For example and referring now to at least FIGS. 2-9E, the cooling tip slot or slots 86 is located on the tip portion 84 and is defined by the merger of diffuser portions 88 that extend from cooling holes 90 that provide fluid communication of a cooling fluid (e.g., air) from one of a plurality of internal plenums 92 of the airfoil 74.

In one embodiment, the cooling holes 90 and their associated diffuser portions 88 and ultimately cooling tip slot or slots 86 are formed by an electrical discharge machining (EDM) process. Although any equivalent drilling process may be used. As such and by having the diffuser portions 88 meet with each other below the surface of the tip portion 84 an improved cooling slot film is provided. For example and referring to at least FIG. 8A, line 94 may be referred to a point where diffuser portions 88 begin to extend from cooling holes 90. The diffusers 88 provide an enlarging opening that extends from cooling hole 90. At this point the diffusers 88 are not in fluid communication with each other until line 96, which occurs below the tip surface 98 of the tip portion 84. Accordingly, holes 90 individually provide cooling air from a plenum 92 to a diffuser 88 and ultimately all of the cooling air flow is merged together in the cooling tip slot or slots 86 (defined by the merged diffusers 88) in an area below the tip surface 98. This flow of cooling air in holes 90 is in an area depicted by arrow 100, which extends up to line 94, while the air flow exclusive in individual diffusers 88 is defined by the area depicted by arrows 102 and the area of merged cooling air from diffusers 88 may be defined the area depicted by arrows 104.

The use of slot film cooling in tip slot or slots 86 improves the cooling film effectiveness on the blade tip 84. By using slot cooling as opposed to individual cooling holes the film effectiveness is improved which cools the downstream surface more efficiently. Moreover, structural rigidity of the airfoil 74 and/or airfoil tip 84 is maintained as additional material of the tip 84 is left intact when forming tip slot or slots 86 as opposed to an enlarged opening which may not achieve the cooling film effectiveness of various embodiments of the present disclosure.

The slot or slots 86 is/are metered by individual cooling holes 90 to provide the beneficial slot film effectiveness, but with a minimum amount of required cooling flow. In one embodiment, a diffusion angle (as defined by angles 106 and 108 in FIG. 8A) on the slot film is between 5-20 degrees in order to avoid undesired separation and non-fill of the coolant slot or slots 86. Other completed ranges include 10-15 degrees. Although specific ranges are disclosed herein it is, of course, understood that ranges greater or less than the aforementioned values are contemplated to be within the scope of various embodiments of the present disclosure. It being understood that each diffuser 88 may have at least two diffusion angles extending from a direction of the cooling air flow passing though opening 90. In one embodiment, the angles may be the same and in some embodiments, the diffuser angles 106 and 108 may be different from each other. Still further and in yet another embodiment, an end diffuser 88 may have one diffuser angle that is 0. See the edge 110 of diffuser 88 in FIG. 8A. Here, one diffusion angle is zero while the other one may be in the aforementioned range of 5-20 degrees. Although one embodiment illustrates the diffuser angle as being zero it is, of course, understood that various embodiments of the present disclosure contemplate tip slots with all of the diffuser angles being greater than zero.

As illustrated in FIGS. 8A-8F, the tip slot 86 may comprise four merged diffusers 88 and cooling openings 90. This tip slot 86 is illustrated by bracket 112 in at least FIGS. 2, 4 and 6. Alternatively, the tip slot 86 may comprise three merged diffusers 88 and cooling openings 90. This tip slot 86 is illustrated by bracket 114 in at least FIGS. 2, 4 and 6. Still further, the tip slot 86 may comprise two merged diffusers 88 and cooling openings 90. This tip slot 86 is illustrated by bracket 116 in at least FIGS. 2, 4 and 6. See also, FIGS. 9A-9E. Of course, other configurations (e.g., greater than four merged diffusers) are considered to be within the scope of various embodiments of the present disclosure. Still further and as illustrated, the tip 84 may have a plurality of tip slots 86 of varying sizes and configurations (as mentioned above and herein) or the tip 84 may have a single tip slot 86 of varying sizes and configurations.

Referring back now to at least FIGS. 2 and 3A-3C, the tip slot or tip slots 86 may be located on a tip 84 that has a squealer pocket 118 located therein. Squealer pockets are used in turbine blades to reduce the leakage flow over the tip and also to reduce the heat load to the part. The squealer pocket configuration creates an effective labyrinth seal which reduces the amount of tip leakage and brings with it a performance benefit. The squealer pocket has thermal benefits as the pocket itself experiences lower heat transfer coefficients as the pocket acts as a mini-plenum which reduces the velocity of the gaspath air in this region. Also the squealer pocket can be coated with thermal barrier coatings which do not get abraded off (even if blade tip rub does occur) since they are recessed from the tip surface which provides additional thermal benefits.

Figure 4:
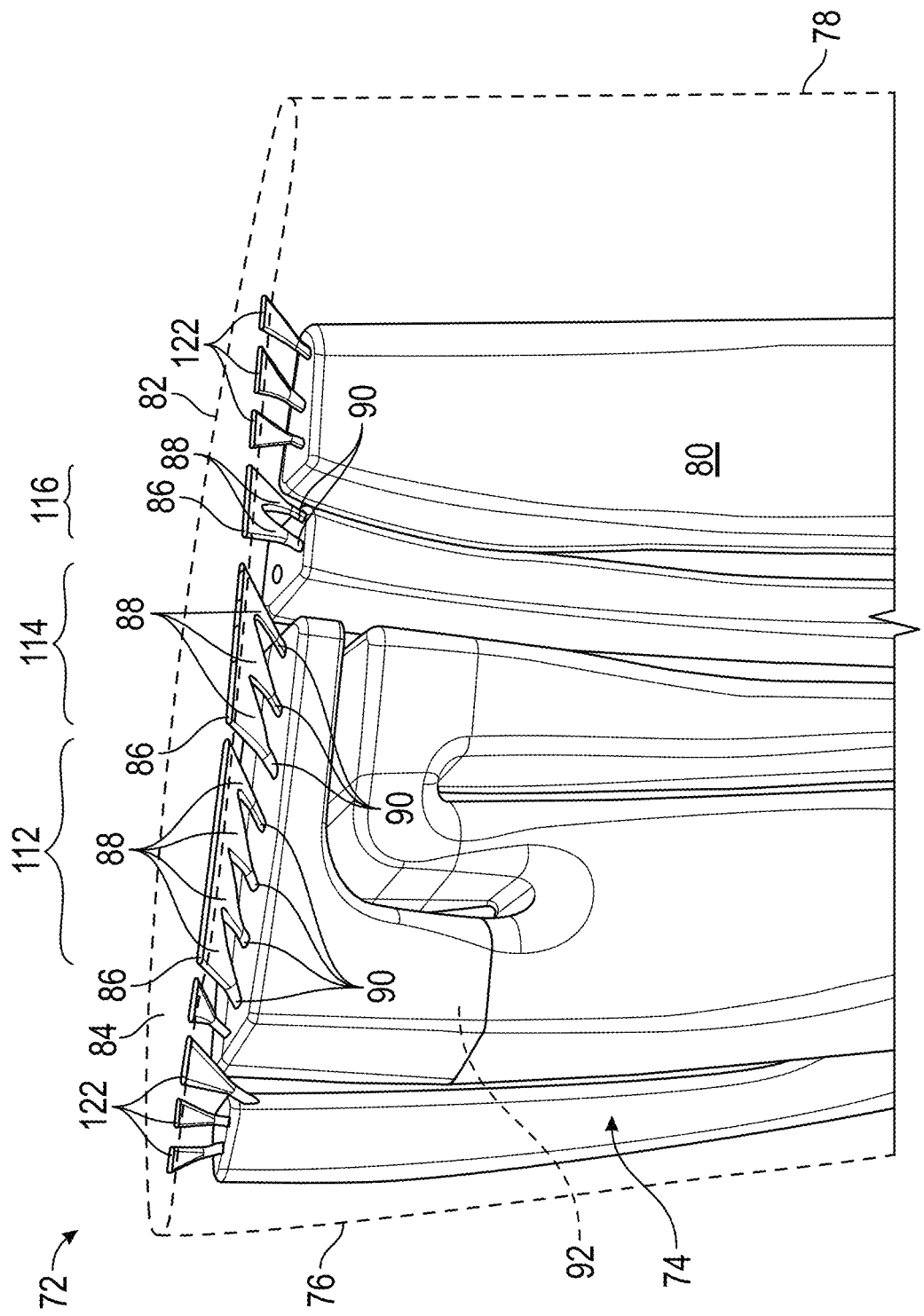
FIG. 4 is a perspective view illustrating a turbine blade in accordance with an another embodiment of the disclosure.
Figure 5:
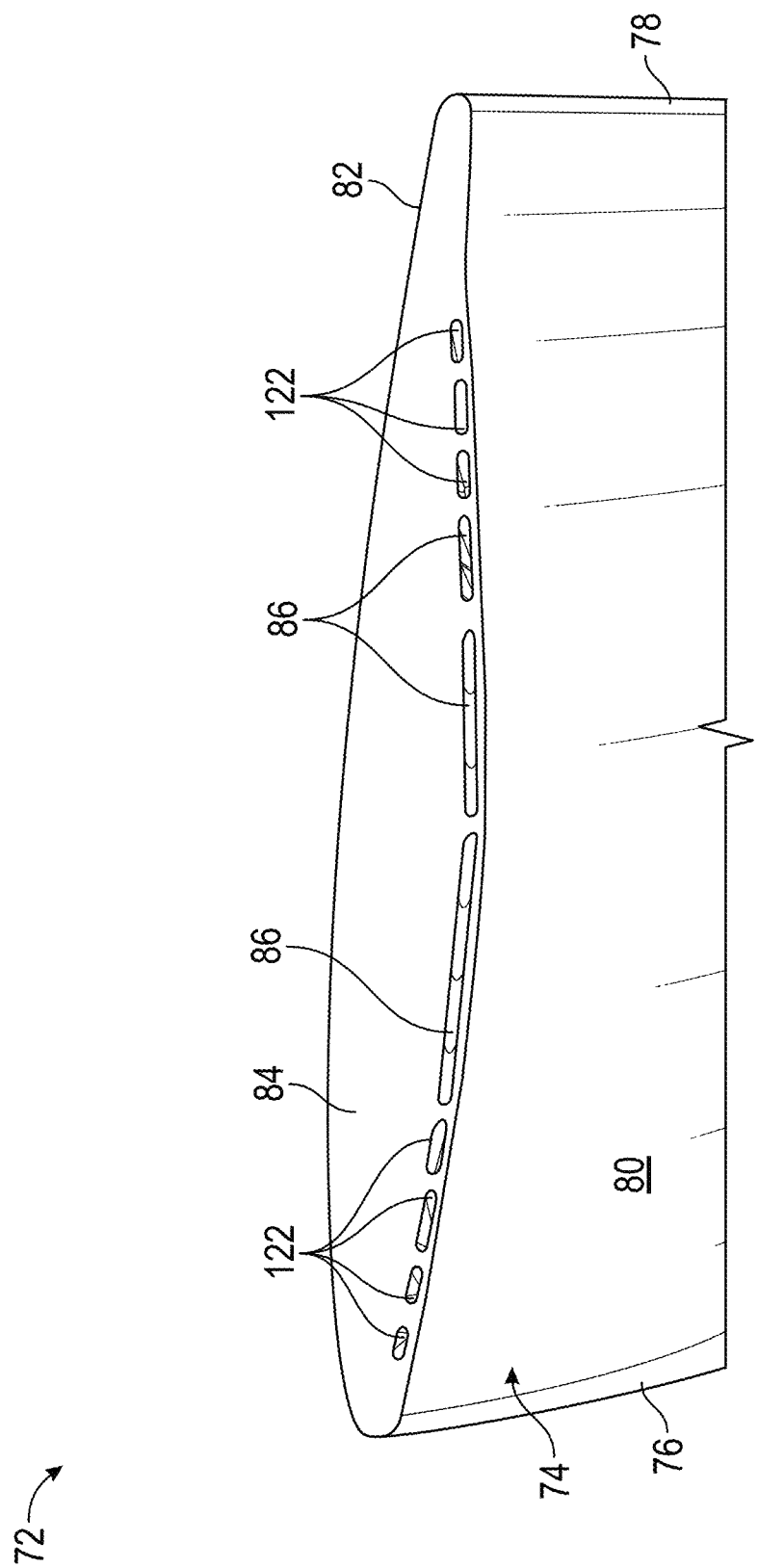
FIG. 5 is a top perspective view of the turbine blade illustrated in FIG. 4.

Still further and referring now to at least FIGS. 4 and 5 and in yet another embodiment, the tip slot or tip slots 86 may be located on a tip 84 that does not have a squealer pocket located therein. In FIG. 4, the exterior of the blade 72 is illustrated in phantom or by dashed lines.

Figure 6:
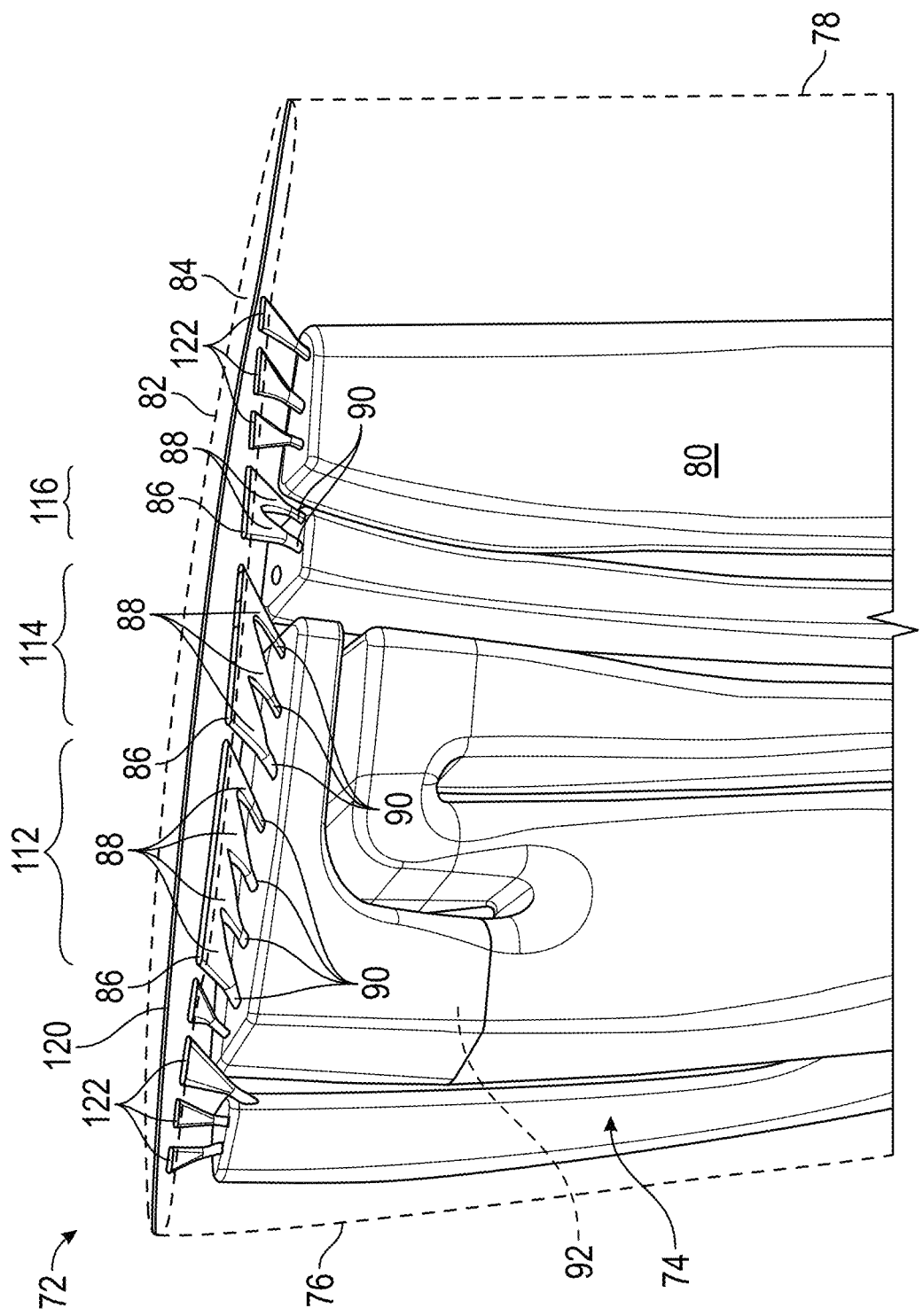
FIG. 6 is a perspective view illustrating a turbine blade in accordance with yet another embodiment of the disclosure.
Figure 7:
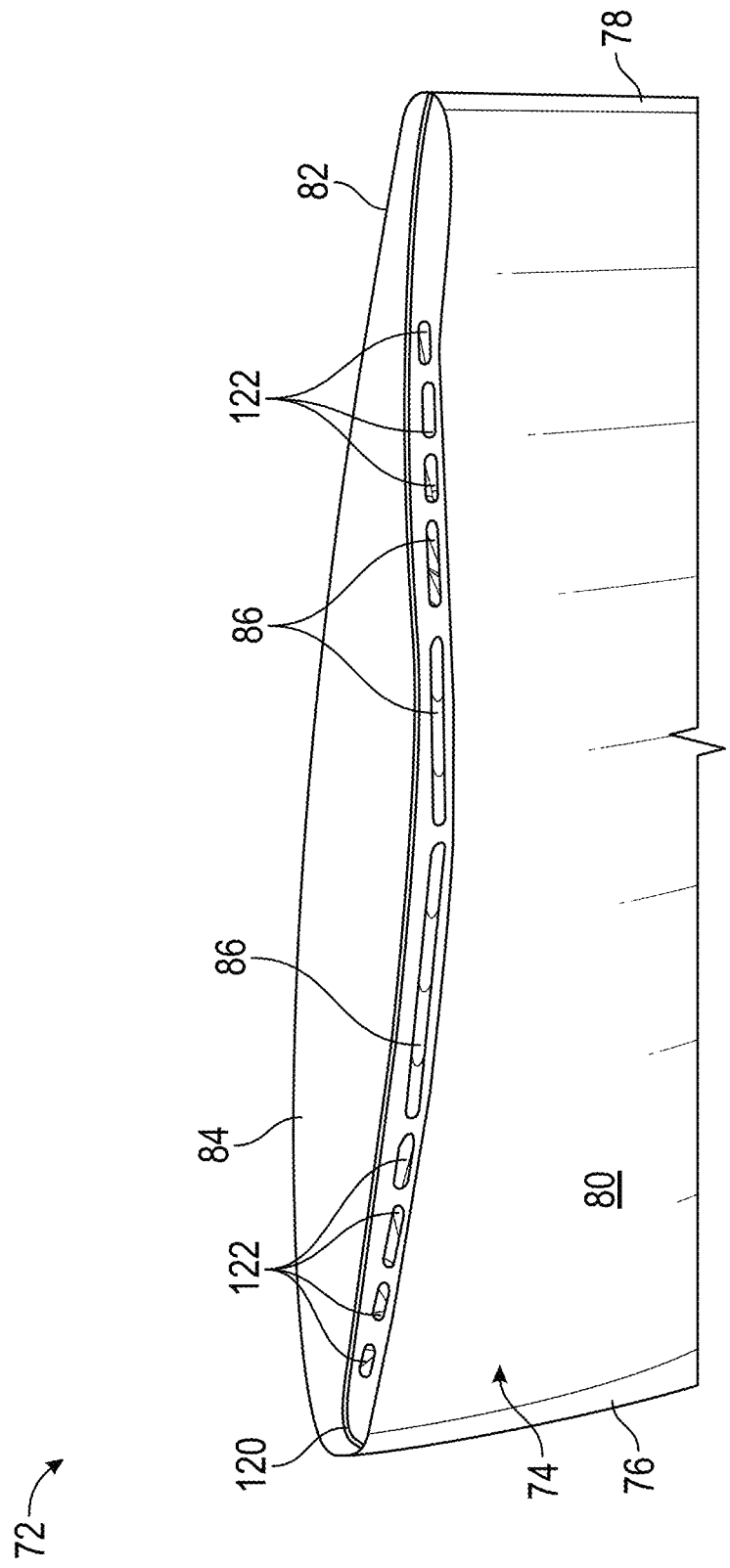
FIG. 7 is a top perspective view of the turbine blade illustrated in FIG. 6.
Figure 8A:
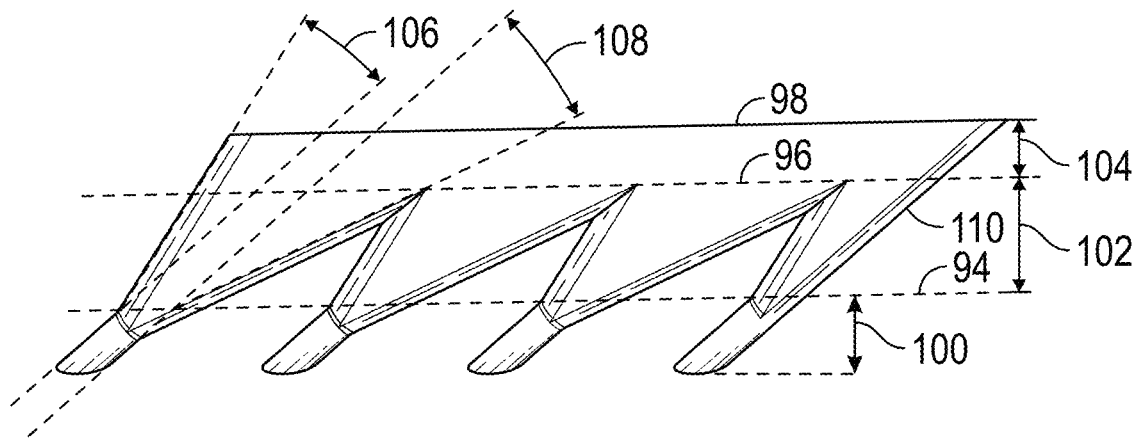
FIGS. 8A-8F are various views of a slot for positioning on a component of the gas turbine engine.
Figure 8B:
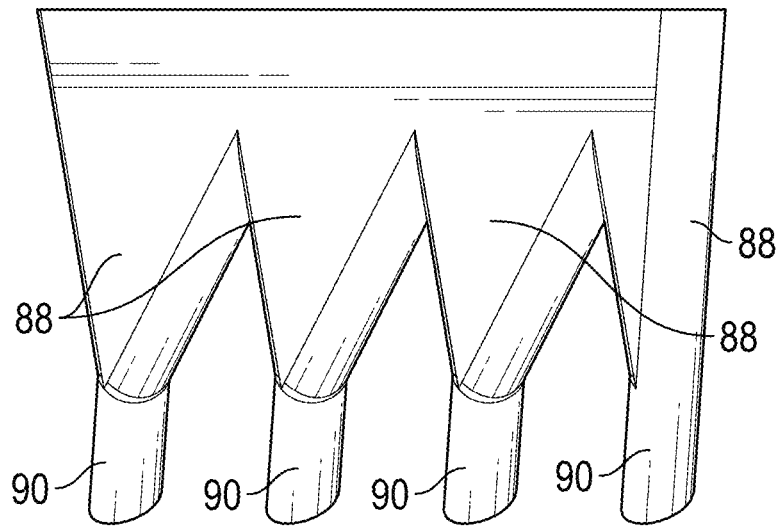
Figure 8C:
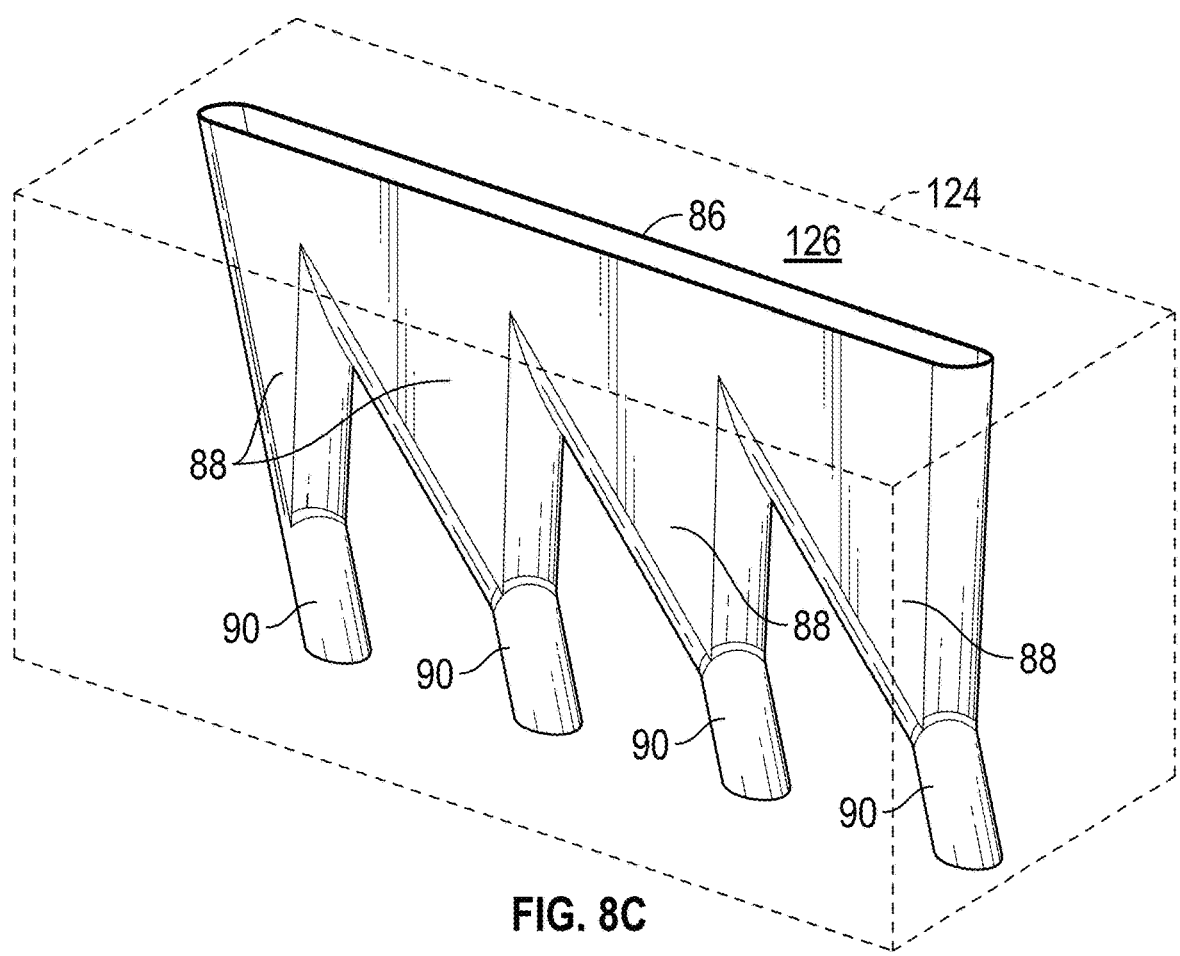
Figure 8D:
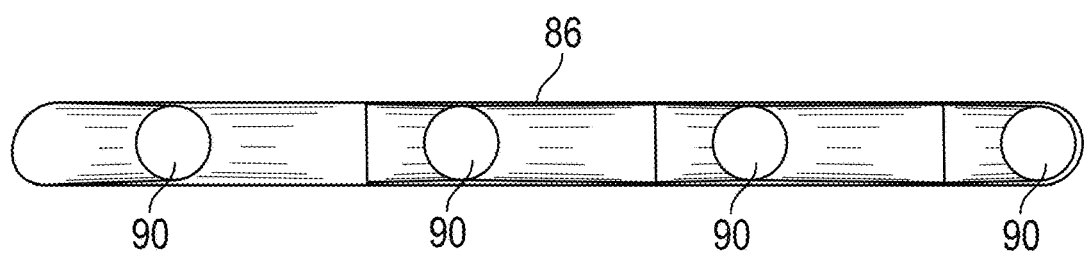
Figure 8E:
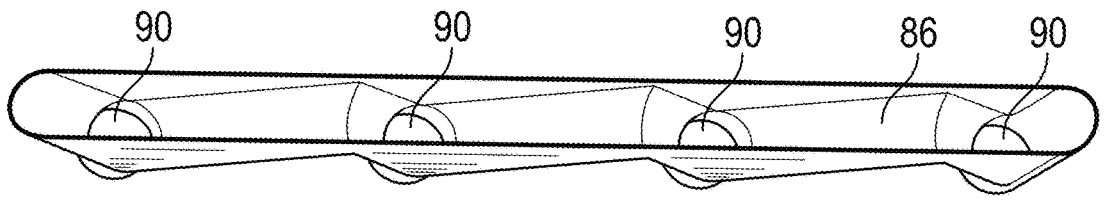
Figure 8F:
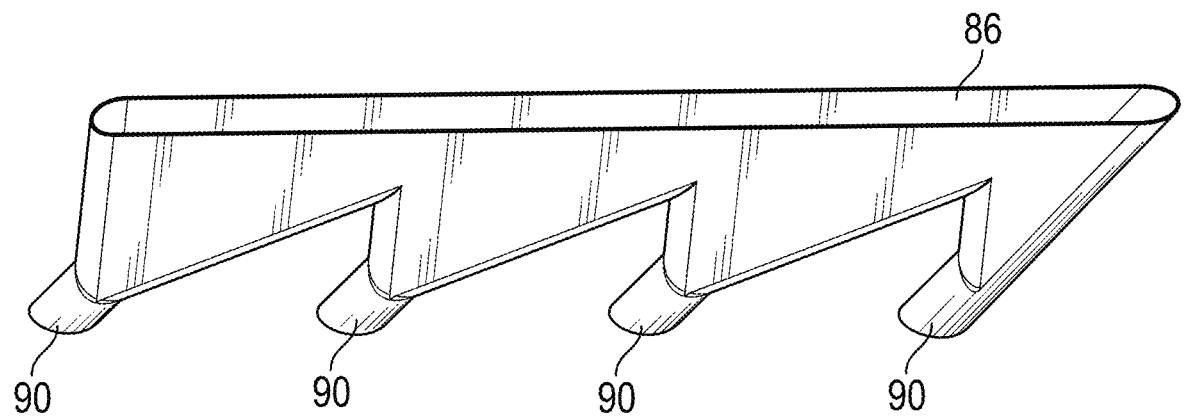
Figure 9A:
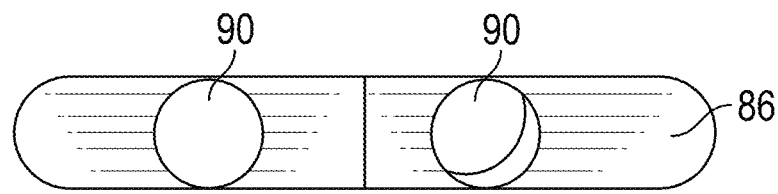
FIGS. 9A-9E are various views of another slot for positioning on the component of the gas turbine engine.
Figure 9B:
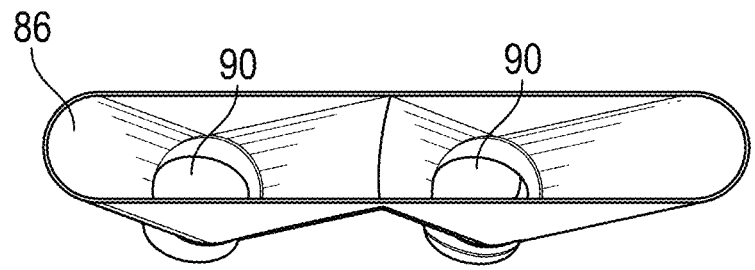
Figure 9C:
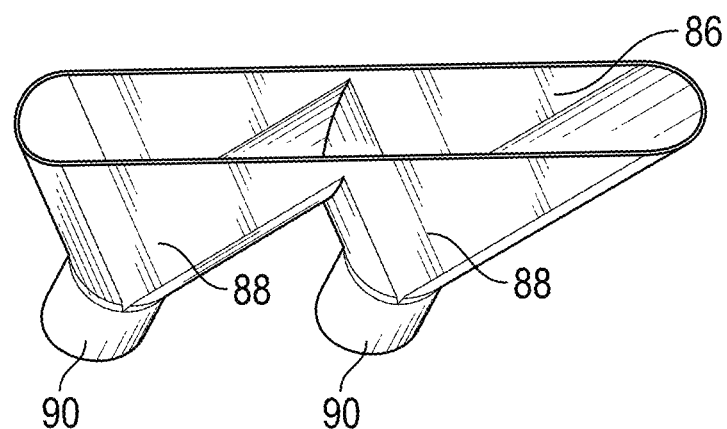
Figure 9D:
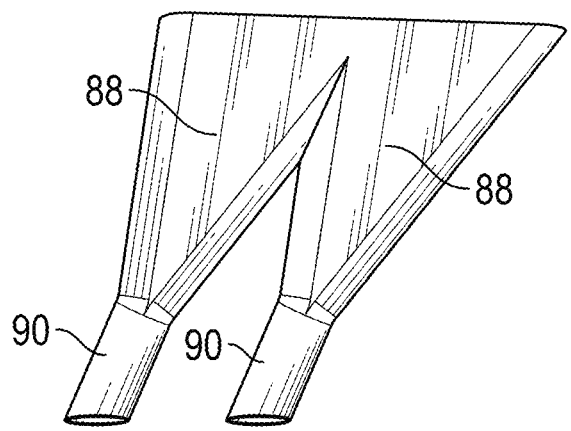
Figure 9E:
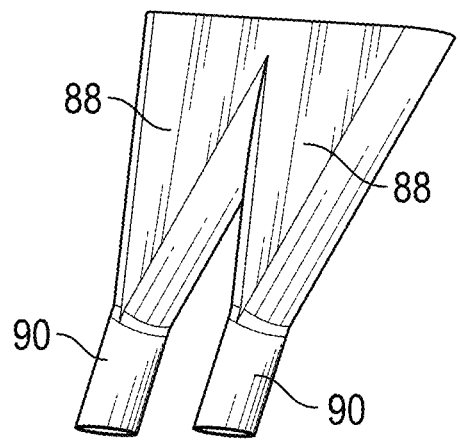

Still further and referring now to at least FIGS. 6 and 7 and in yet another embodiment, the tip slot or tip slots 86 may be located on a tip shelf 120 of the tip 84. Tip shelf features are used in turbine blades to allow cooling holes to easily be placed near the tip of the blade. The tip shelf also removes the tip edge on the pressure side where the heat transfer coefficient is extremely high and is prone to rapid oxidation. In FIG. 6, the exterior of the blade 72 is illustrated in phantom or by dashed lines.

In one embodiment and as illustrated in at least FIGS. 3A-3C, 5 and 7, the pressure side of the blade 80 at least proximate to the tip is illustrated as being convex. The combination of a slot or slots 86 on a tip or tip portion 84 with a convex pressure side tip may provide improved film effectiveness and cooling on highly thermally loaded blade tips which may be due to very long true chord of the blade 72. Accordingly various embodiments of the present disclosure contemplate the aforementioned slot or slots 86 with a blade 72 that may have a convex pressure side configuration, which may be proximate to the tip 84. Although, the illustrated embodiments contemplate a convex pressure side proximate to the tip it is, of course, also understood that the slot or slots 86 may be used with a blade that may have a different pressure side configuration such as convex or any combination thereof, which may be proximate to the tip or in other locations. Still further, the suction side 82 of the blade either proximate to or away from the tip may be concave or convex in shape depending on the application.

Although various embodiments are illustrated, it is understood that various embodiments of the present disclosure contemplate any combination of the foregoing (e.g., tip slot or tip slots 86 in tip 84 with or without squealer pocket 118 and/or tip slot or slots 86 in tip shelf 120). Still further and while the tip slot or slots 86 is/are illustrated as being located proximate to the pressure side 80 of the airfoil 74 it is understood that the tip slot 86 can be located proximate to the suction side 82 or both pressure and suction sides of the airfoil 74.

In addition and as illustrated in the attached FIGS. the airfoil 74 may further include a plurality of cooling openings 122 in addition to the aforementioned cooling slot or slots 86. Cooling openings 122 may be located in anyone of the tip portion, the leading edge, the trailing edge, the pressure side, the suction side or any combination of the foregoing.

The benefits of this disclosure include improved cooling film effectiveness and cooler tip surfaces. By using this technology the tip temperatures can be reduced for a set amount of cooling flow.

Alternatively this disclosure allows the cooling flow to be reduced for a set tip temperature if this is so desired. The slot cooling film provides improved cooling film effectiveness because the coverage (or hole exit footprint normal to the flow direction divided by the hole pitch normal to the flow direction) is substantially improved. The slot 86 minimizes any gaps in the cooling flow for the hot air to go around and get in contact with the blade part.

As mentioned above and although various embodiments of the present disclosure are related to turbine blades with a slot or slots 86 for abating the heat load on the tip of the airfoil of the turbine blade as well as preventing the detrimental effects associated with leakage airflows it is, of course, understood that embodiments of this disclosure may be applied on any turbomachinery component that requires the aforementioned cooling or tip cooling. For example, the slot or slots 86 may be positioned on compressor blades of the gas turbine engine, stationary vanes, blade outer air seals (BOAS) or any other component or surface requiring cooling or film cooling. The aforementioned turbine blades, compressor blades, stationary vanes, blade outer air seals (BOAS) or any other component or surface may be collectively referred to as component or an engine component or gas turbine engine component 124, which is illustrated in phantom in at least FIG. 8C. Accordingly, a slot or slots 86 may be positioned on a surface 126 of the component or an engine component or gas turbine engine component 124.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A component for a gas turbine engine, comprising:
   a cooling slot located on a surface of the component, the cooling slot being defined by a plurality of diffuser portions each extending from a respective one of a plurality of cooling openings providing cooling fluid to the cooling slot, each of the plurality of cooling openings being fluidly coupled to at least one internal plenum of the component, wherein each of the plurality of diffuser portions merges with another one of the plurality of diffuser portions below the surface of the component and each of the plurality of diffuser portions are defined by a diffuser angle with respect to the respective one of the plurality of cooling opening openings.

2. The component as in claim 1, wherein the diffuser angle is in a range of 5-20 degrees with respect to the cooling opening.

3. The component as in claim 1, wherein a plurality of cooling slots are located in the surface of the component.

4. The component as in claim 3, wherein at least one of the plurality of cooling slots is defined by four diffuser portions each extending from a respective one of a plurality of cooling openings providing cooling fluid to the at least one cooling slot.

5. The component as in claim 1, wherein the component is a blade having an airfoil with a tip portion and the cooling slot is located in the tip portion of the airfoil, and the blade further comprises a squealer pocket located in a surface of the tip portion.

6. The component as in claim 1, wherein the component is a blade having an airfoil with a tip portion and the cooling slot is located in a tip shelf of the airfoil.

7. The component as in claim 1, wherein the component is a blade having an airfoil with a tip portion and the blade is a turbine blade and at least a portion of a pressure side of the blade proximate to the tip portion is convex.

8. The component as in claim 1, wherein the component is a blade having an airfoil with a tip portion and the cooling slot is located proximate to a pressure side of the airfoil.

9. The component as in claim 8, wherein each of the plurality of diffuser portions merges with another one of the plurality of diffuser portions below a surface of the tip portion.

10. The component as in claim 1, wherein the cooling slot is defined by four diffuser portions each extending from a respective one of a plurality of cooling openings providing cooling fluid to the at least one cooling slot.

11. The component as in claim 1, wherein the cooling slot is defined by two diffuser portions each extending from a respective one of the plurality of cooling openings providing cooling fluid to the at least one cooling slot.

12. A gas turbine engine, comprising:
   a compressor section;
   a combustor section; and
   a turbine section; wherein the turbine section includes a plurality of rotors having a plurality of radially disposed rotor blades at least some of the plurality of radially disposed rotor blades having:
      an airfoil, the airfoil having a tip portion; and
      a cooling slot located in the tip portion of the airfoil, the cooling slot being defined by a plurality of diffuser portions each extending from a respective one of a plurality of cooling openings providing cooling fluid to the cooling slot, each of the plurality of cooling openings being fluidly coupled to at least one internal plenum of the airfoil, wherein each of the plurality of diffuser portions merges with another one of the plurality of diffuser portions below a surface of the tip portion and each of the plurality of diffuser portions are defined by a diffuser angle with respect to the respective one of the plurality of cooling opening openings.

13. The gas turbine engine as in claim 12, wherein the diffuser angle is in a range of 5-20 degrees with respect to the cooling opening.

14. The gas turbine engine as in claim 12, wherein a plurality of cooling slots are located in the tip portion of the airfoil and the rotor blades are rotor blades of a high pressure turbine.

15. The gas turbine engine as in claim 12, wherein the cooling slot is located in a tip shelf of the airfoil and the airfoil further comprises additional cooling openings.

16. A method of cooling a portion of a component of a gas turbine engine, comprising:
   forming a cooling slot in the portion by a machining process, wherein the cooling slot is located on a surface of the component and is defined by a plurality of diffuser portions each extending from a respective one of a plurality of cooling openings providing cooling fluid to the cooling slot, each of the plurality of cooling openings being fluidly coupled to at least one internal plenum of the component, wherein each of the plurality of diffuser portions merges with another one of the plurality of diffuser portions below the surface of the component and each of the plurality of diffuser portions are defined by a diffuser angle with respect to the respective one of the plurality of cooling opening openings.

* * * * *